(12) United States Patent
Onishi et al.

(10) Patent No.: US 6,374,027 B1
(45) Date of Patent: Apr. 16, 2002

(54) OPTICAL FIBER TRANSMISSION-LINE

(75) Inventors: Masashi Onishi; Masaaki Hirano; Takatoshi Kato, all of Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 47 days.

(21) Appl. No.: 09/636,635

(22) Filed: Aug. 11, 2000

(30) Foreign Application Priority Data

Sep. 9, 1999 (JP) .......................................... 11-255780

(51) Int. Cl.$^7$ .............................. G02B 6/02; G02B 6/16
(52) U.S. Cl. ......................... 385/123; 385/24; 359/161
(58) Field of Search .................... 385/123, 24; 359/161

(56) References Cited

U.S. PATENT DOCUMENTS

| | | | | |
|---|---|---|---|---|
| 5,613,028 A | * | 3/1997 | Antos .......................... | 385/123 |
| 5,887,105 A | | 3/1999 | Bhagavatula et al. ........ | 385/123 |
| 5,894,537 A | | 4/1999 | Berkey et al. ............... | 385/123 |
| 6,134,366 A | * | 10/2000 | Loeb ........................... | 385/123 |

OTHER PUBLICATIONS

V.Bhagavatula, "Novel fibers for dispersion–managed high-–bit–rate systems", OFC'98 Tech. Digest, paper TuD2.*
M.Segatto, "Use of dispersion managed fibers in parallel WDM systems", IEEE IMOC'99 Proceedings, pp. 75–78.*
M.Segatto, "Multi Gbit/s bit parallel WDM transmission using dispersion managed fibers", IEEE Phot. Tech. Lett., 12(8), pp. 995–997, Aug. 2000.*
M.Murakami, "Long–haul WDM transmission using higher order fiber dispersion management", J. of Light. Tech. 18(9), pp. 1197–1204, Sep. 2000.*
K. Shiraki et al., Effect of chromatic dispersion change along the fiber length on WDM transmission systems with DSF, Institute of Electronics, Information and Communication Engineers, 1997, pp. 1–4.
V. Bhagavatula et al., Novel Fibers for Dispersion Managed High–Bit–Rate–Systems, Third Optoelectronics and Communications Conference Technical Digest, Jul. 1998, pp. 362–363.

* cited by examiner

*Primary Examiner*—Cassandra Spyrou
*Assistant Examiner*—Leo Boutsikaris
(74) *Attorney, Agent, or Firm*—McDermott, Will & Emery

(57) ABSTRACT

There is provided an optical fiber transmission-line with which the four-wave mixing generation can be suppressed effectively and also transmission loss is small. An optical fiber transmission-line 10 is dispersion-managed by a single silica optical fiber thereof being provided alternately in its longitudinal direction with parts 10a where the chromatic dispersion at the wavelength 1550 nm is positive and parts 10b where it is negative. In any one repeater span of the transmission-line there are at least four sign change positions P at which the sign of the chromatic dispersion changes in the longitudinal direction; the absolute value of the average changing rate of chromatic dispersion in each sign change locality A, each sign change locality A being a range including a sign change position P over which the absolute value of the chromatic dispersion is less than 2 ps/nm/km, is not less than 0.008 ps/nm/km/m and not greater than 4 ps/nm/km/m; the absolute value of the average value of the chromatic dispersion over the whole conduit is not greater than 2 ps/nm/km; the average value of the effective core area over the whole transmission-line is not less than 50 $\mu m^2$; the average value of the transmission loss over the whole transmission-line is not greater than 0.25 dB/km; and the average value of the polarization mode dispersion over the whole transmission-line is not greater than 0.2 ps/km/$^{1/2}$.

5 Claims, 4 Drawing Sheets

OPTICAL FIBER TRANSMISSION-LINE

BACKGROUND OF THE INVENTION

1. Field of the Invention

This invention relates to an optical fiber transmission-line for transmitting multiple wavelength optical signals in a wavelength division multiplexing transmission system.

2. Related Background Arts

A wavelength division multiplexing (WDM) transmission system can effect high speed, high capacity optical communications by transmitting multiple wavelength optical signals. Because the transmission loss of a silica optical fiber used as an optical fiber transmission-line is small in the vicinity of the wavelength 1.55 μm, and optical amplifiers for amplifying optical signals in the wavelength 1.55 μm band have been put into practical use, multiple wavelength optical signals in the wavelength 1.55 μm band are used in WDM transmission systems.

When in an optical fiber transmission-line for transmitting multiple wavelength optical signals there is chromatic dispersion in the optical signal band (the wavelength 1.55 μm band), the pulse waveform of the optical signal spreads and transmission quality deteriorates. Therefore, from this point of view, it is desirable for the chromatic dispersion value in the optical signal wavelength band to be small. On the other hand, when the chromatic dispersion value in the optical signal wavelength band is substantially zero, the nonlinear optical phenomenon of four-wave mixing tends to occur, crosstalk and noise arise, and transmission quality deteriorates. The four-wave mixing generation can be suppressed by making repeater spans short and reducing optical signal power, but because this makes it necessary to provide many optical amplifiers the optical transmission system is expensive as a whole.

To deal with such problems, dispersion-managed optical fiber transmission-lines have been proposed, wherein, in one optical fiber, parts where the chromatic dispersion value at the wavelength 1550 nm is positive and parts where it is negative are provided alternately in the longitudinal direction. If this kind of optical fiber transmission-line is used, by making the average value of the chromatic dispersion value in the optical fiber transmission-line as a whole substantially zero, it is possible to suppress transmission quality deterioration caused by chromatic dispersion. And because at most points in the optical fiber transmission-line the absolute value of the chromatic dispersion value is not in the vicinity of zero, it is thought to be possible also to suppress transmission quality deterioration caused by four-wave mixing.

For example, in Reference 1, 'Shiroki et al., "Effects of Dispersion Fluctuation in WDM Systems using Dispersion Shifted Fiber", Proceeding of the 2000 Institute of Electronics, Information and Communication Engineers General Conference, B-10-210(1997)', an optical fiber transmission-line wherein the chromatic dispersion value at the wavelength 1550 nm fluctuates in the longitudinal direction sinusoidally about the value zero is discussed. In Reference 1, for an optical fiber transmission-line dispersion-managed in such a manner, numerical analysis of the relationship between the period and the amplitude of the fluctuation of the chromatic dispersion value and transmission distances is carried out.

In Reference 2, 'V. A. Bhagavatula, et al., "Novel Fibers for Dispersion Managed High-Bit-Rate-Systems", OECC '98 Technical Digest, 15Cl-2 (1998)', an optical fiber transmission-line wherein parts where the chromatic dispersion value at the wavelength 1550 nm is positive and parts where it is negative are provided alternately in the longitudinal direction with a period of 0.1 km to 6 km is discussed. In Reference 2 it is confirmed by experiment that by using an optical fiber transmission-line dispersion-managed in such a manner it is possible to suppress the four-wave mixing generation.

However, it has been discovered by the present inventors that, even when a dispersion-managed optical fiber transmission-line of the kind discussed in Reference 1 or Reference 2 is used, it does not always suppress the four-wave mixing generation effectively, and transmission loss sometimes increases.

SUMMARY OF THE INVENTION

It is therefore an object of the present invention to provide an optical fiber transmission-line with which the four-wave mixing generation can be suppressed effectively and also in which transmission loss is minimal.

To achieve this object, the invention provides an optical fiber transmission-line wherein, at the wavelength 1550 nm, in one repeater span there are at least four sign change positions at which the sign of the chromatic dispersion of the transmission-line changes; the absolute value of the average changing rate of chromatic dispersion in each sign change locality, a sign change locality being a range including a sign change position over which the absolute value of the chromatic dispersion is less than 2 ps/nm/km, is not less than 0.008 ps/nm/km/m and not greater than 4 ps/nm/km/m; the absolute value of the average value of the chromatic dispersion over the whole transmission-line is not greater than 2 ps/nm/km; the average value of the effective core area over the whole transmission-line is not less than 50 μm$^2$; the average value of the transmission loss over the whole transmission-line is not greater than 0.25 dB/km; and the average value of the polarization mode dispersion over the whole transmission-line is not greater than 0.2 ps/km$^{1/2}$.

This optical fiber transmission-line dispersion managed by having parts where the chromatic dispersion at the wavelength 1550 nm is positive and parts where it is negative provided in the longitudinal direction alternately. As a result of there being in one repeater span at least four sign change positions at which the sign of the chromatic dispersion at the wavelength 1550 nm changes, it is possible for the cumulative value of the chromatic dispersion to be made small. As a result of the minimum value of a preferred range of the absolute value of the average changing rate of chromatic dispersion in each sign change locality, a sign change locality being a range including a sign change position over which the absolute value of the chromatic dispersion is less than 2 ps/nm/km, being made not less than 0.008 ps/nm/km/m, it is possible to suppress the four-wave mixing generation. As a result of the maximum value of the preferred range of the absolute value of the average changing rate of chromatic dispersion in each sign change locality being made 4 ps/nm/km/m, it is possible to suppress an increase in transmission loss. Here, "one repeater span" means a section between a transmitter (or a repeater) and a receiver (or a repeater) in which no repeater is provided.

By the absolute value of the average value of the chromatic dispersion over the whole transmission-line being made not greater than 2 ps/nm/km at the wavelength 1550 nm, transmission quality deterioration caused by waveform distortion is suppressed. By the average value of the effective core area over the whole transmission-line being made not less than 50 μm$^2$ at the wavelength 1550 nm, the nonlinear optical phenomena is suppressed. As a result of the average value of the transmission loss over the whole transmission-line being made not greater than 0.25 dB/km at the wavelength 1550 nm, the optical transmission system as a whole becomes inexpensive, because it is possible to make repeater spans long and reduce the number of optical amplifiers to be installed. And by the average value of the polarization mode dispersion over the whole transmission-line being made not greater than 0.2 ps/km$^{1/2}$ at the wavelength 1550 nm, the transmission-line is optimized for carrying out high-speed optical communication. With an optical fiber transmission-line according to the invention, as a result of the several characteristics defined above being provided simultaneously, it is possible to suppress both waveform distortion caused by dispersion and the four-wave mixing generation; transmission loss is minimal; and the transmission-line can be used suitably even in an optical transmission system with a bit rate of over 40 Gb/s.

Preferably, in an optical fiber transmission-line according to the invention, the absolute value of the changing rate of chromatic dispersion in each sign change locality is not less than 0.04 ps/nm/km/m and not greater than 4 ps/nm/km/m. In this case, the four-wave mixing generation can be suppressed still further.

And preferably, in an optical fiber transmission-line according to the invention, the temperature dependency of the average value of the chromatic dispersion over the whole transmission-line is not greater than 0.005 ps/nm/km/K. In this case, even when, for example, the optical fiber transmission-line is to be installed on land and large temperature fluctuations of, for example, 50K are anticipated, the fluctuation of the average value of the chromatic dispersion over the whole of the optical fiber transmission-line is not more than 0.25 ps/nm/km, which is desirable in carrying out high-speed optical communication.

And preferably, in an optical fiber transmission-line according to the invention, the chromatic dispersion is varied by a core diameter and a fiber diameter being modulated in the longitudinal direction. Or, the chromatic dispersion is varied by a core diameter being modulated with a cladding diameter kept constant in the longitudinal direction. Both of these cases are suited to realizing an optical fiber transmission-line according to the invention.

The above and further objects and novel features of the invention will be more fully clarified from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

In order to more fully understand the drawings used in the detailed description of the present invention, a brief description of each drawing is provided.

DETAILED DESCRIPTION OF THE PREFERRED EMBODIMENTS

Figure 1:
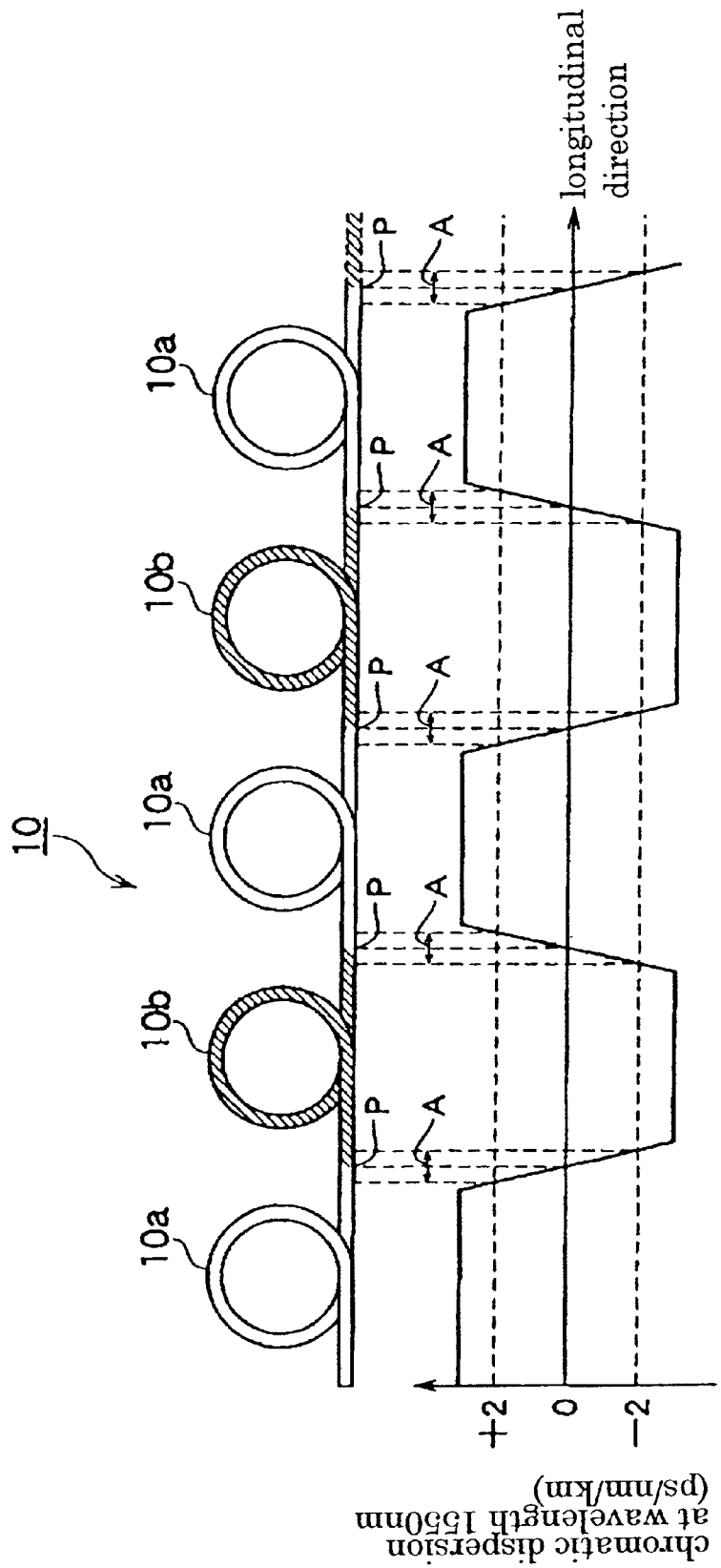
FIG. 1 is a schematic view illustrating an optical fiber transmission-line according to the invention.

In the following, preferred embodiments of the present invention will be explained in detail with reference to the accompanying drawings. To facilitate comprehension of the explanation, the same reference numerals denote the same parts, where possible, throughout the drawings, and a repeated explanation will be omitted. The dimensions in the drawings are partly exaggerated and do not always correspond to actual ratios of dimensions.

First, the process by which the present invention was arrived at will be described. In an optical fiber transmission-line dispersion-managed by having parts where the chromatic dispersion at wavelength 1550 nm is positive and parts where it is negative provided in the longitudinal direction alternately in a single optical fiber, there are positions where the sign of the chromatic dispersion changes (sign change positions). The range around a sign change position over which the absolute value of the chromatic dispersion is less than 2 ps/nm/km (below which optical transmission problems caused by the four-wave mixing generation are considered to arise) will be called "a sign change locality".

If there are numerous sign change positions, or if the sign change localities are long, the four-wave mixing generation ceases to be negligible and the effect of the dispersion-management becomes minimal. Therefore, from the point of view of suppressing the four-wave mixing generation, it is preferable for there to be few sign change positions, or for the sign change localities to be short. Considering the latter in particular, it is desirable for the absolute value of the average changing rate of chromatic dispersion in each sign change locality to be large.

On the other hand, to make the chromatic dispersion vary, it is necessary to vary a parameter of the optical fiber structure such as the core radius; however, a sharp change in the optical fiber structure will result in an increase in transmission loss caused by a mismatch in mode field diameters. Consequently, from the point of view of suppressing transmission loss increase, it is desirable for any change in the optical fiber structure, that is, in the absolute value of the changing rate of chromatic dispersion, to be small.

Thus, the present inventors have discovered that, from the point of view of suppressing both the four-wave mixing generation and increases in transmission loss, there is preferred range of the absolute value of the changing rate of chromatic dispersion. The present invention was made on the basis of this knowledge.

Figure 2:
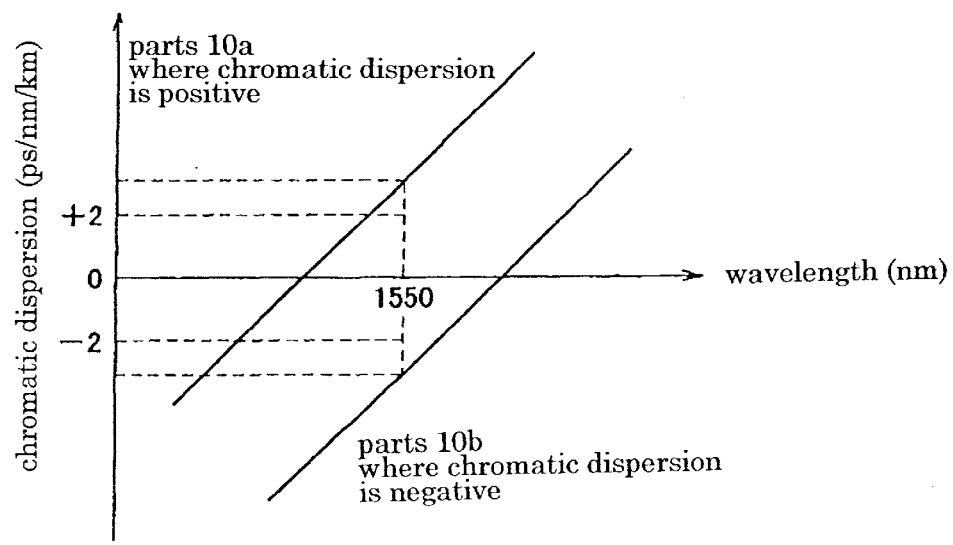
FIG. 2 is a graph showing respective chromatic dispersion characteristics of parts of an optical fiber transmission-line according to the invention where the chromatic dispersion is positive and parts where it is negative.

Next, a preferred embodiment of an optical fiber transmission-line according to the invention will be described with reference to the accompanying drawings. FIG. 1 is a schematic view of the optical fiber transmission-line 10 of this preferred embodiment. This optical fiber transmission-line dispersion managed by having parts 10a where the chromatic dispersion at the wavelength 1550 nm is positive and parts 10b where it is negative provided in the longitudinal direction alternately in a single silica optical fiber. FIG. 2 is a graph showing the respective chromatic dispersion characteristics of the parts 10a of the optical fiber transmission-line 10 where the chromatic dispersion is positive and the parts 10b where it is negative.

In this optical fiber transmission-line 10 there are in the longitudinal direction in one repeater span at least four sign change positions P at which the sign of the chromatic dispersion at the wavelength 1550 nm changes. The required number of sign change positions P in one repeater span of the optical fiber transmission-line depends on the accumulation of the chromatic dispersion and the degree of waveform distortion of the optical signal caused by nonlinear optical phenomena. For example, if the length of a repeater span of the optical fiber transmission-line 10 is 50 km and there are four sign change positions P in this repeater span, the length of one segment between a given sign change position P and the next sign change position P is 10 km. And if to suppress the four-wave mixing generation the average value of the chromatic dispersion in each segment is made at least 2 ps/nm/km, the cumulative value of the chromatic dispersion in each segment is at least 20 ps/nm. This cumulative chromatic dispersion value of 20 ps/nm may constitute a problem in an optical transmission system with a bit rate of 40 Gb/s or more. To avoid such a problem, it is important to increase the number of sign change positions P and thereby reduce the cumulative value of the chromatic dispersion in each segment. Accordingly, in implementing dispersion-management, it becomes a prerequisite in practice that there be at least four sign change positions P in any one repeater span.

Figure 3:
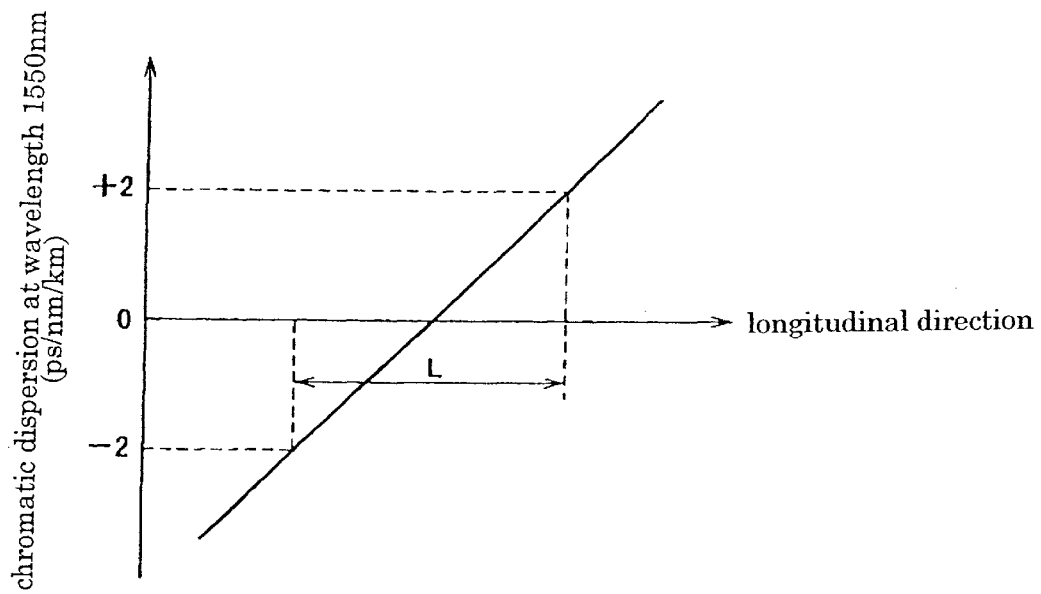
FIG. 3 is a graph showing the chromatic dispersion in a sign change locality of an optical fiber transmission-line according to the invention.

Also, this optical fiber transmission-line 10 has a preferred range for the absolute value of the average changing rate of chromatic dispersion at the wavelength 1550 nm in each sign change locality A, each sign change locality A being a range including a sign change position over which the absolute value of the chromatic dispersion is less than 2 ps/nm/km. FIG. 3 is a graph illustrating the average changing rate of chromatic dispersion in a sign change locality A of the optical fiber transmission-line 10 of this preferred embodiment. Supposing that a length L (units: m) in the longitudinal direction is needed for the chromatic dispersion to change from −2 ps/nm/km to +2 ps/nm/km, then the absolute value of the average changing rate of chromatic dispersion is 4/L (ps/nm/km/m). The minimum value of the preferred range of the absolute value of the average changing rate of chromatic dispersion in each sign change locality A is 0.008 ps/nm/km/m, and more preferably it is 0.04 ps/nm/km/m. The maximum value of the preferred range of the absolute value of the average changing rate of chromatic dispersion in each sign change locality A is 4 ps/nm/km/m. The reason for this range being preferable has already been discussed qualitatively and will be discussed quantitatively hereinafter.

Also, in this optical fiber transmission-line 10, at the wavelength 1550 nm, the absolute value of the average value of the chromatic dispersion in the whole transmission-line is not greater than 2 ps/nm/km. Because of this, an optical signal transmitted through the optical fiber transmission-line 10 suffers little pulse waveform distortion, and transmission quality deterioration is suppressed.

And, in this optical fiber transmission-line 10, at the wavelength 1550 nm, the average value of the effective core area over the whole transmission-line is made not less than 50 $\mu$m$^2$. As a result, nonlinear optical phenomena in the optical fiber transmission-line 10 is suppressed and deterioration caused by nonlinear optical phenomena is suppressed.

And, in this optical fiber transmission-line 10, at the wavelength 1550 nm, the average value of the transmission loss in the whole transmission-line is not greater than 0.25 dB/km. As a result, because it is possible to make repeater spans long and reduce the number of optical amplifiers to be installed, the optical transmission system as a whole becomes inexpensive.

And, in this optical fiber transmission-line 10, at the wavelength 1550 nm, the average value of the polarization mode dispersion in the whole transmission-line is not greater than 0.2 ps/km. The reason why this range is preferable is as follows. For example, supposing that the length of the optical fiber transmission-line 10 is 500 km, if the average value of the polarization mode dispersion in the whole transmission-line is not greater than 0.2 ps/km$^{1/2}$, the polarization mode dispersion of the whole of the optical fiber transmission-line 10 is 4.5 ps or less. This value is equivalent to about 20% of a 25 ps time slot of a signal in an optical transmission system with a bit rate of 40 Gb/s or more, and is desirable for carrying out high-speed optical communication.

Also, in this optical fiber transmission-line 10, at the wavelength 1550 nm, the temperature dependency of the average value of the chromatic dispersion in the whole transmission-line is preferably not greater than 0.005 ps/nm/km/K. In this case, even when the optical fiber transmission-line is to be installed on land and large temperature fluctuations of, for example, 50K are anticipated, the fluctuation of the average value of the chromatic dispersion over the whole of the optical fiber transmission-line 10 is not more than 0.25 ps/nm/km, which is desirable in carrying out high-speed optical communication with a bit rate of 40 Gb/s or more.

Figure 4:
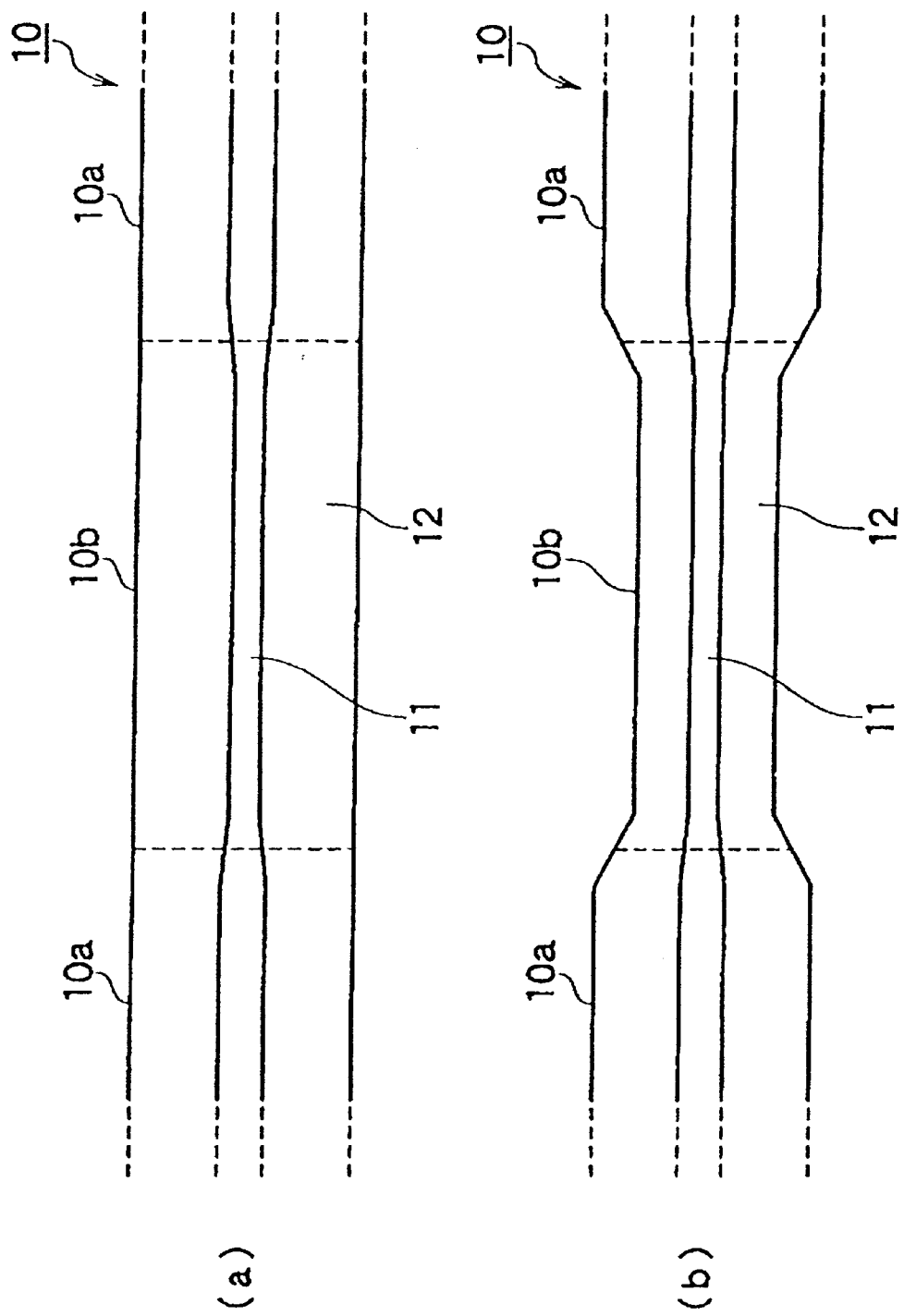
FIGS. 4A and 4B are views illustrating structures of optical fiber transmission-lines according to the invention.

FIGS. 4A and 4B are views illustrating different structures of the optical fiber transmission-line 10 of this preferred embodiment. These figures are sectional views obtained when the optical fiber is cut on a plane including its optical axis. An optical fiber transmission-line 10 wherein the chromatic dispersion varies in the longitudinal direction as described above can be obtained, for example, as shown in FIG. 4A by the diameter of a core region 11 being modulated with the diameter of a cladding region 12 kept constant in the longitudinal direction. Generally, the larger the diameter of the core region 11 is, the larger the chromatic dispersion can be made. This kind of optical fiber transmission-line 10 can be manufactured by making a preform in which the diameter of the core part varies in the longitudinal direction and the diameter of the cladding part is fixed in the longitudinal direction and drawing from this preform an optical fiber whose cladding diameter is fixed.

Or, the optical fiber transmission-line 10 can be obtained, for example, as shown in FIG. 4B by the diameter of a core region 11 and the diameter of a fiber region 12 being modulated in the longitudinal direction. In this case also, generally, the larger the diameter of the core region 11 is, the larger the chromatic dispersion can be made. This kind of optical fiber transmission-line 10 can be manufactured by making a preform in which the respective diameters of the core part and the cladding part are fixed in the longitudinal direction and varying the cladding diameter in the longitudinal direction while drawing an optical fiber from this preform.

Figure 5:
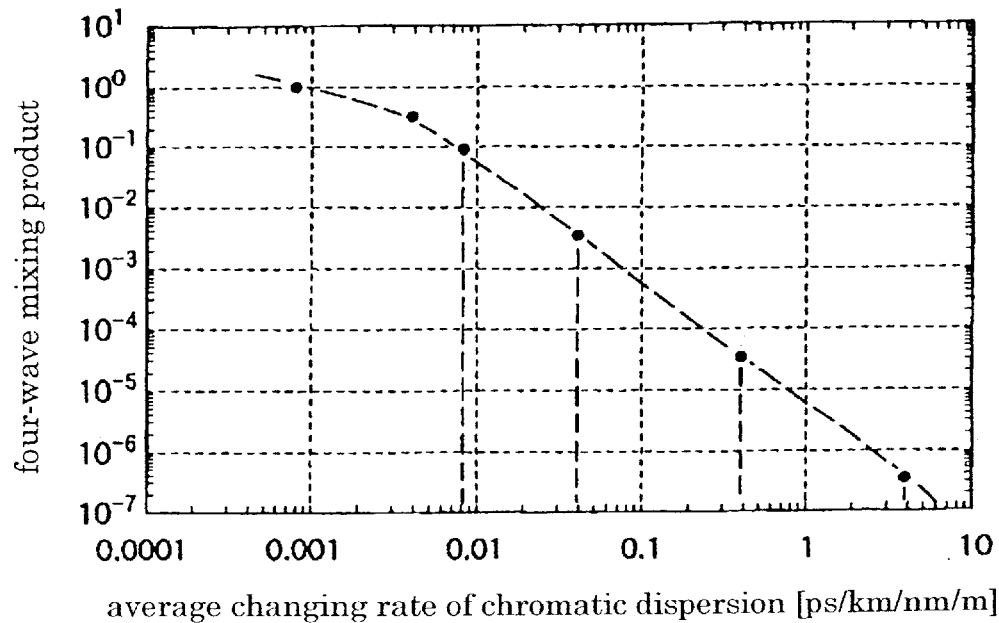
FIG. 5 is a graph showing the relationship between the absolute value of the average changing rate of chromatic dispersion in a sign change locality and the four-wave mixing product.
Figure 6:
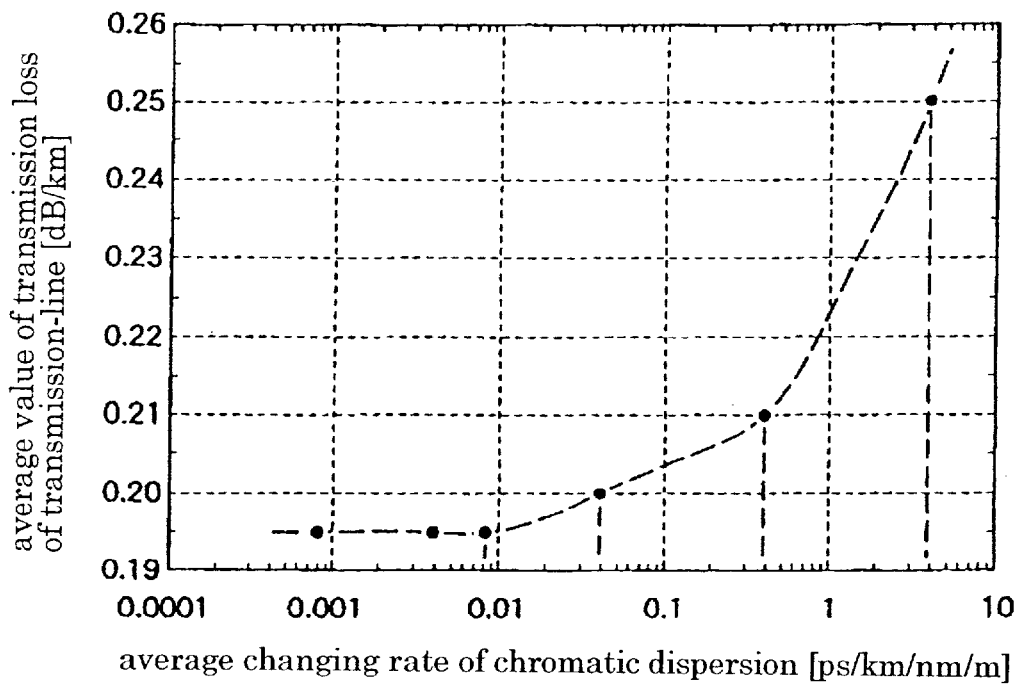
FIG. 6 is a graph showing the relationship between the absolute value of the average rate of change of chromatic dispersion in a sign change locality and the average value of the transmission loss in the whole of an optical fiber transmission-line 10.

Next, a specific example of the optical fiber transmission-line 10 of this preferred embodiment, and the basis of the preferred range of the absolute value of the average changing rate of chromatic dispersion in each sign change locality A will be explained. The optical fiber transmission-line 10 described hereinafter is a silica optical fiber having the structure described above with reference to FIG. 4B. The parts 10a where the chromatic dispersion is positive at the wavelength 1550 nm each have a chromatic dispersion of +2 ps/nm/km and a length of about 2 km. The parts 10b where the chromatic dispersion is negative at the wavelength 1550 nm each have a chromatic dispersion of −2 ps/nm/km and a length of about 2 km. The average value of the effective core area over the whole of the optical fiber transmission-line 10 is 55 $\mu m^2$, and the average value of the polarization mode dispersion over the whole transmission-line is 0.08 ps/km$^{1/2}$. This kind of optical fiber transmission-line 10 was made and the power of light produced by four-wave mixing and the average value of the transmission loss in the whole of the optical fiber transmission-line 10 were each measured for different values of the absolute value of the average changing rate of chromatic dispersion in each of the sign change localities. FIG. 5 is a graph showing the relationship between the absolute value of the average changing rate of chromatic dispersion in a sign change locality and the four-wave mixing product. FIG. 6 is a graph showing the relationship between the absolute value of the average changing rate of chromatic dispersion in a sign change locality and the average value of the transmission loss in the whole of the optical fiber transmission-line 10.

As can be seen from FIG. 5, the larger the absolute value of the average changing rate of chromatic dispersion in each sign change locality, the smaller the relative power of light produced by four-wave mixing. This is because, as discussed above, the sharper the change is in chromatic dispersion in the sign change localities, the shorter the range is over which optical transmission problems caused by the four-wave mixing generation are generally considered to arise (the range over which the absolute value of the chromatic dispersion is less than 2 ps/nm/km).

A case wherein the length L is 1000 m and the chromatic dispersion changes by 1 ps/nm/km, that is, a case wherein the absolute value of the average changing rate of chromatic dispersion is 0.001 ps/nm/km/m, will be taken as a reference case. This reference case is not suitable as a dispersion-managed optical fiber transmission-line, because four-wave mixing tends to occur. When the absolute value of the average changing rate of chromatic dispersion is 0.008 ps/nm/km/m, the power of the light produced by four-wave mixing decreases to about one tenth of the reference case. In a case wherein the absolute value of the average changing rate of chromatic dispersion is 0.04 ps/nm/km/m, the power of the light produced by four-wave mixing decreases to about one three-hundredth compared to the reference case. And in a case wherein the absolute value of the average changing rate of chromatic dispersion is 0.4 ps/nm/km/m, the power of the light produced by four-wave mixing decreases to about one thirty-thousandth compared to the reference case. It is apparent from this that the minimum value of a preferable range of the absolute value of the average changing rate of chromatic dispersion in the sign change locality is 0.008 ps/nm/km/m, and more preferably is 0.04 ps/nm/km/m.

On the other hand, as can be seen from FIG. 6, the larger the absolute value of the average changing rate of chromatic dispersion in sign change localities, the larger the average value of the transmission loss in the whole of the optical fiber transmission-line 10. This is because, as discussed above, the sharper the change in the chromatic dispersion in a sign change locality, the sharper also the change in the optical fiber structure, and this results in an increase in transmission loss caused by a mismatch in mode field diameters. When the absolute value of the average changing rate of chromatic dispersion is 4 ps/nm/km/m, the transmission loss is 0.25 dB/km. And when the absolute value of the average changing rate of chromatic dispersion is 0.4 ps/nm/km/m, the transmission loss is 0.21 dB/km. It is apparent from this that the maximum value of a preferable range of the absolute value of the average changing rate of chromatic dispersion in the sign change localities is 4 ps/nm/km/m, and more preferably is 0.4 ps/nm/km/m.

What is claimed is:

1. An optical fiber transmission-line wherein, at the wavelength 1550 nm, in one repeater span there are at least four sign change positions at which the sign of chromatic dispersion of the transmission-line changes in the longitudinal direction; the absolute value of the average changing rate of chromatic dispersion in each sign change locality, each sign change locality being a range including a sign change position over which the absolute value of the chromatic dispersion is less than 2 ps/nm/km is not less than 0.008 ps/nm/km/m and not greater than 4 ps/nm/km/m; the absolute value of the average value of the chromatic dispersion over the whole transmission-line is not greater than 2 ps/nm/km; the average value of the effective core area over the whole transmission-line is not less than 50 $\mu m^2$; the average value of the transmission loss over the whole transmission-line is not greater than 0.25 dB/km; and the average value of the polarization mode dispersion over the whole transmission-line is not greater than 0.2 ps/km$^{1/2}$.

2. An optical fiber transmission-line according to claim 1, wherein the absolute value of the average changing rate of chromatic dispersion in said each sign change locality is not less than 0.04 ps/nm/km/m and not greater than 4 ps/nm/km/m.

3. An optical fiber transmission-line according to claim 1, wherein the temperature dependency of the average value of the chromatic dispersion in the whole transmission-line is not greater than 0.005 ps/nm/km/K.

4. An optical fiber transmission-line according to claim 1, wherein the chromatic dispersion of the transmission-line is varied by a core diameter and a fiber diameter being modulated in the longitudinal direction.

5. An optical fiber transmission-line according to claim 1, wherein the chromatic dispersion of the transmission-line is varied by a core diameter being modulated with a cladding diameter kept constant in the longitudinal direction.

* * * * *